(12) United States Patent
Xu et al.

(10) Patent No.: US 9,332,533 B2
(45) Date of Patent: May 3, 2016

(54) ACK/NACK/SR RESOURCE MAPPING METHOD AND APPARATUS

(75) Inventors: Jing Xu, Beijing (CN); Xueming Pan, Beijing (CN); Zukang Shen, Beijing (CN); Yanan Lin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 166 days.

(21) Appl. No.: 14/234,072

(22) PCT Filed: Jul. 4, 2012

(86) PCT No.: PCT/CN2012/078173
§ 371 (c)(1),
(2), (4) Date: Jan. 21, 2014

(87) PCT Pub. No.: WO2013/010440
PCT Pub. Date: Jan. 24, 2013

(65) Prior Publication Data
US 2014/0219201 A1    Aug. 7, 2014

(30) Foreign Application Priority Data

Jul. 21, 2011 (CN) .......................... 2011 1 0205174

(51) Int. Cl.
*H04W 72/04* (2009.01)
*H04L 1/18* (2006.01)
*H04L 5/00* (2006.01)

(52) U.S. Cl.
CPC ............. *H04W 72/0406* (2013.01); *H04L 1/18* (2013.01); *H04L 1/1861* (2013.01); *H04L 1/1893* (2013.01); *H04L 1/1896* (2013.01); *H04L 5/0055* (2013.01); *H04L 5/0064* (2013.01)

(58) Field of Classification Search
CPC ... H04W 72/00; H04W 72/005; H04W 72/02; H04W 72/04; H04W 72/0406; H04W 70/044; H04L 1/18; H04L 1/1961; H04L 1/1893; H04L 1/1896
See application file for complete search history.

(56) References Cited

U.S. PATENT DOCUMENTS

| 8,583,128 | B2 | 11/2013 | Choi et al. | |
| 8,638,729 | B2 * | 1/2014 | Pajukoski | H04L 1/0025 370/329 |

(Continued)

FOREIGN PATENT DOCUMENTS

| CN | 101715211 A | 5/2010 |
| CN | 101959307 A | 1/2011 |
| CN | 102083211 A | 6/2011 |
| CN | 102238737 A | 11/2011 |
| WO | 2008085000 A1 | 7/2008 |
| WO | 2010148795 A1 | 12/2010 |

OTHER PUBLICATIONS

3GPP Technical Specification Group Radio Access Network; 3GPP TS 36.213 V10.2.0: Evolved Universal Terrestrial Radio Access (E-UTRA) Physical layer procedures (Release 10); 3rd Generation Partnership Project (3GPP); Jun. 2011; pp. 92-115, part 10.

(Continued)

*Primary Examiner* — Anh Ngoc Nguyen
(74) *Attorney, Agent, or Firm* — Harness, Dickey & Pierce, P.L.C.

(57) ABSTRACT

Examples of the present disclosure provide an ACK/NACK/SR resource mapping method and an apparatus. According to the technical solution provided by the examples of the present disclosure, in a system including a terminal utilizing a first type protocol and a terminal utilizing a second type protocol, the base station allocates the ACK/NACK/SR resources corresponding to the second type protocol in an area outside of the ACK/NACK/SR resource area reserved for the terminal utilizing the first type protocol, and informs the terminal utilizing the second type protocol of the allocation information of the corresponding ACK/NACK/SR resources. Thus, the terminal utilizing the second type protocol may transmit feedback information via the corresponding ACK/NACK/SR resources.

18 Claims, 7 Drawing Sheets

(56) References Cited

U.S. PATENT DOCUMENTS

| | | | |
|---|---|---|---|
| 2011/0007695 A1* | 1/2011 | Choi | H04L 5/0007 370/329 |
| 2012/0113904 A1* | 5/2012 | Anderson | H04W 72/042 370/329 |
| 2013/0077541 A1 | 3/2013 | Lin et al. | |

OTHER PUBLICATIONS

International Search Report (in Chinese and English) for PCT/CN2012/078173, mailed Oct. 18, 2012; ISA/CN.

Chinese Office Action for Application No. 201110205174.8 dated Apr. 9, 2013, and its English translation thereof.
3rd Generation Partnership Project; Technical Specification Group Radio Access Network; Evolved Universal Terrestrial Radio Access (EUTRA); Physical Layer Procedures (Release 10); 3GPP TS 36.213 V10.2.0 (Jun. 2011).
European Office Action for Application No. 12 814 325.2-1851 dated Nov. 19, 2014.
European Office Action for Application No. 12 814 325.2-1851 dated Jun. 25, 2015.
European Search Report for Application No. 12814325.2-1851/2736293 dated Jun. 2, 2014.

* cited by examiner

ACK/NACK/SR RESOURCE MAPPING METHOD AND APPARATUS

CROSS-REFERENCE TO RELATED APPLICATIONS

This application is a U.S. National Phase application under 35 U.S.C. §371 of International Application No. PCT/CN2012/078173, filed Jul. 4, 2012, entitled "ACK/NACK/SR RESOURCE MAPPING METHOD AND APPARATUS", the entire contents of which are incorporated herein by reference.

FIELD OF THE DISCLOSURE

The present disclosure relates to telecommunications techniques, and more particularly, to an acknowledgement (ACK)/negative acknowledgement (NACK)/scheduling request (SR) resource mapping method and an apparatus.

BACKGROUND OF THE DISCLOSURE

Time division duplex (TDD), as one of two basic duplexing modes, attracts more and more attentions along with the increasing requirement of wideband radio communication on bandwidth. In a TDD system, uplink transmission and downlink transmission use the same frequency resources and transmit uplink/downlink signals on different time slots. Familiar TDD systems include: time division-synchronous code division multiple access (TD-SCDMA) system in 3rd generation (3G) mobile communication technique and time division-long term evolved (TD-LTE) system in 4th generation (4G) mobile communication technique. Configuration of uplink slots and downlink slots is static or semi-static. Usually, uplink-downlink slot ratio is determined according to a cell type and an approximate service proportion during network deployment and remains unchanged. This is a simple and effective solution in a macro cell with a large coverage area. With the development of techniques, more and more pico cells and low-power base stations such as home NodeB are deployed for providing small coverage in a local area. In this kind of cell, there are less users and service requirements of the users change frequently. Therefore, the uplink-downlink service proportion in such cells needs to be changed dynamically. Although standard such as TD-LTE also supports dynamic online-changing of the uplink-downlink slot ratio of a cell, a complicated signaling procedure and much configuration time are required, which decreases system performance and cannot catch up with service change in real time.

Based on the above problem, an existing technique provides a dynamic uplink-downlink subframe allocation solution. The detailed processing is as follows.

During a certain time period, four kinds of subframe types are configured, including a subframe always as downlink transmission, a subframe always as uplink transmission, and subframes which act as uplink or downlink transmission flexibly. FIG. 1 is a schematic diagram illustrating a dynamic uplink-downlink subframe allocation solution according to the existing technique. In this technique, the adopted time period is a radio frame (which is an example, other time periods may be adopted), wherein subframes #0 and #5 are always as downlink subframes, subframes #2 and #7 are always as uplink subframes, subframes #1 and #6 are special subframes (or may be seen as always downlink subframes), subframes #3, #4, #8 and #9 are configured as uplink or downlink transmission flexibly.

For the last kind of subframe, the base station may configure flexibly according to a current service requirement and channel condition, so as to be fit for the dynamic change of the service requirement.

For the TDD system, downlink hybrid automatic repeat request (HARQ) feedback utilizes bundling and multiplexing techniques, i.e., acknowledgement (ACK)/negative acknowledgement (NACK) of multiple downlink subframes are fed back on a physical uplink control channel (PUCCH) of one uplink subframe.

For the multiplexing technique, ACK/NACK status is related to both information bit fed back on the PUCCH and an ACK/NACK/scheduling request (SR) resource index.

For the bundling technique, the ACK/NACK status is merely related to the information bit fed back on the PUCCH. However, in order to avoid ACK/NACK/SR resource conflict between users, a mapping method similar to that of the multiplexing technique is adopted for the ACK/NACK/SR resource index. Generally, one uplink-downlink configuration corresponds to one HARQ time sequence solution and one ACK/NACK/SR resource mapping solution. Therefore, there is no ACK/NACK/SR resource conflict.

SUMMARY OF THE DISCLOSURE

Examples of the present disclosure provide an ACK/NACK/SR resource mapping method and an apparatus, so as to solve a problem of ACK/NACK/SR resource conflict between R11 and/or following version users and low version users.

According to an example of the present disclosure, an ACK/NACK/SR resource mapping method is provided. The method includes:

allocating, by a base station in a system comprising a terminal utilizing a first type protocol and a terminal utilizing a second type protocol, ACK/NACK/SR resources corresponding to the terminal utilizing the second type protocol in an area outside of an ACK/NACK/SR resource area reserved for the terminal utilizing the first type protocol; and receiving, by the base station, feedback information of the terminal utilizing the second type protocol on the ACK/NACK/SR resources corresponding to the terminal utilizing the second type protocol.

According to still another example of the present disclosure, an ACK/NACK/SR resource mapping method is provided. The method includes:

obtaining, by a terminal utilizing a second type protocol in a system comprising a terminal utilizing a first type protocol and the terminal utilizing the second type protocol, allocation information of ACK/NACK/SR resources corresponding to the terminal utilizing the second type protocol according to higher layer signaling transmitted by a base station and/or a predefined rule; wherein the ACK/NACK/SR resources corresponding to the terminal utilizing the second type protocol is allocated in an area outside of an ACK/NACK/SR resource area reserved for the terminal utilizing the first type protocol;

determining, by the terminal utilizing the second type protocol, the ACK/NACK/SR resources corresponding to the terminal utilizing the second type protocol according to the allocation information of the ACK/NACK/SR resources; and transmitting, by the terminal utilizing the second type protocol, feedback information to the base station on the ACK/NACK/SR resources corresponding to the terminal utilizing the second type protocol.

According to yet another example of the present disclosure, a terminal utilizing a second type protocol is provided. The terminal is applied in a system including a terminal utilizing a first type protocol and the terminal utilizing the second type protocol. The terminal includes:

an obtaining module, adapted to obtain allocation information of acknowledgement (ACK)/negative acknowledgement (NACK)/scheduling request (SR) resources corresponding to the terminal utilizing the second type protocol according to higher layer signaling transmitted by the base station and/or a predefined rule, wherein the ACK/NACK/SR resources corresponding to the terminal utilizing the second type protocol is allocated in an area outside of an ACK/NACK/SR resource area reserved for the terminal utilizing the first type protocol;

a determining module, adapted to determine the ACK/NACK/SR resources corresponding to the terminal utilizing the second type protocol according to the allocation information corresponding to the ACK/NACK/SR resources obtained by the obtaining module; and a transmitting module, adapted to transmit feedback information to the base station on the ACK/NACK/SR resources determined by the determining module.

Compared with conventional techniques, the technical solution provided by the examples of the present disclosure has the following advantages.

According to the technical solution provided by the examples of the present disclosure, in a system including a terminal utilizing a first type protocol and a terminal utilizing a second type protocol, the base station allocates the ACK/NACK/SR resources corresponding to the second type protocol in an area outside of the ACK/NACK/SR resource area reserved for the terminal utilizing the first type protocol, and informs the terminal utilizing the second type protocol of the allocation information of the corresponding ACK/NACK/SR resources. Thus, the terminal utilizing the second type protocol may transmit feedback information via the corresponding ACK/NACK/SR resources. In a dynamic system, conflict between ACK/NACK/SR resources of terminals utilizing different types of protocols can be avoided, especially conflict between ACK/NACK/SR resources of R11 and/or following version users and low version users.

DETAILED DESCRIPTION OF THE DISCLOSURE

Figure 1:
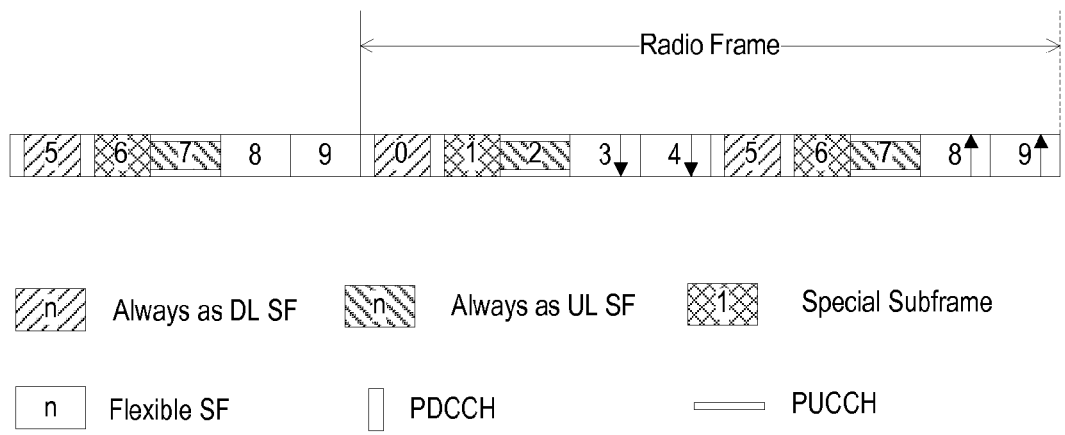
FIG. 1 is a schematic diagram illustrating a dynamic uplink-downlink subframe allocation solution according to a conventional technique.

During the implementation of the present disclosure, the inventor finds at least the following problem in the existing technique.

In a dynamic system, in order to be fit for the flexible change of the uplink-downlink subframe configuration, a new HARQ solution (also includes re-using of an HARQ solution corresponding to an R8 configuration). At the same time, in order to ensure backward compatibility, for low version terminals, an existing uplink-downlink configuration needs to be configured semi-statically and a corresponding HARQ solution has to be adopted. Thus, R11 and/or following version users may adopt a different HARQ solution with low version users. If the users of two different versions both adopt the existing ACK/NACK/SR resource index $n_{PUCCH}^{(1)}$ allocation method, there may be ACK/NACK/SR resource conflict between the users.

According to the existing technique, in the dynamic system, R11 does not have a definite ACK/NACK/SR resource mapping method. If the existing technique is adopted, ACK/NACK/SR resource conflict may be generated between R11 and/or following version users and low version users.

As described, if the existing ACK/NACK/SR resource mapping method is adopted, an ACK/NACK/SR resource conflict may be generated between users adopting protocols of different versions.

An ACK/NACK/SR resource is indicated by index $n_{PUCCH}^{(1)}$. Therefore, configuration and indicating method of $n_{PUCCH}^{(1)}$ are discussed hereinafter.

Hereinafter, conventional configuration method of the ACK/NACK/SR resource index $n_{PUCCH}^{(1)}$ is described.

$n_{PUCCH}^{(1)}$ may be configured by higher layers, which applies to situations that SR, semi-persistent scheduling (SPS) are not scheduled by physical downlink control channel (PDCCH). $n_{PUCCH}^{(1)}$ may also be bundled with $n_{CCE}$, applies to a situation that there is PDCCH scheduling.

Generally, in order to avoid conflict between the $n_{PUCCH}^{(1)}$ configured by the higher layers and the calculated $n_{PUCCH}^{(1)}$, a parameter $N_{PUCCH}^{(1)}$ divides the ACK/NACK/SR resources into two areas. The $n_{PUCCH}^{(1)}$ configured by the higher layers meets $n_{PUCCH}^{(1)} < N_{PUCCH}^{(1)}$, and calculated $n_{PUCCH}^{(1)}$ meets $n_{PUCCH}^{(1)} \geq N_{PUCCH}^{(1)}$.

It should be noted that, the $n_{PUCCH}^{(1)}$ configured by the higher layers is configured by the base station by itself. Therefore, there may be cases that $n_{PUCCH}^{(1)} \geq N_{PUCCH}^{(1)}$.

For facilitating the description, an ACK/NACK/SR resource set indicated by higher layer signaling is referred to as a higher layer configured area; an ACK/NACK/SR resource set bundled with $n_{CCE}$ is referred to as a predefined area or a calculated area. Boundary of the two areas is not defined in standards. However, the high layer configured area is usually ahead of the calculated area and the $N_{PUCCH}^{(1)}$ is taken as the boundary. Hereinafter, for simplicity, this typical situation is taken as an example. In fact, the following examples are not restricted to the typical situation.

In order to reduce resource fragments, the calculated $n_{PUCCH}^{(1)}$ follows a rule of first in subframe then in area (the area refers to a value range of $n_{CCE}$, division of the area is usually related to number of PDCCH symbols, i.e., number of areas equals to the number of PDCCH symbols).

Figure 2:
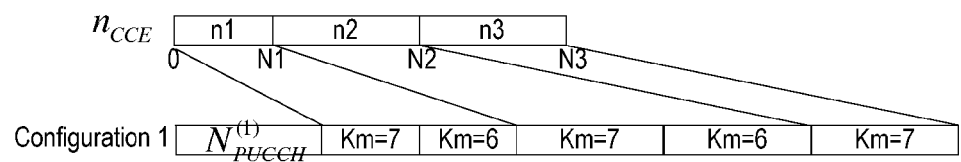
FIG. 2 is a schematic diagram illustrating an ACK/NACK/SR resource index $n_{PUCCH}^{(1)}$ mapping method (configuration 1) according to a conventional technique.

As shown in FIG. 2 which shows an ACK/NACK/SR resource index $n_{PUCCH}^{(1)}$ mapping method (uplink-downlink configuration 1) according to an existing technique. The applied $n_{PUCCH}^{(1)}$ mapping rule is as follows:

$$n_{PUCCH,i}^{(1)} = (M-i-1)N_p + iN_{P+1} + n_{CCE} + N_{PUCCH}^{(1)}.$$

For a TDD system, ACK/NACK bundling or ACK/NACK multiplexing, when M=1, in subframe n, user equipment (UE, i.e., the terminal) uses ACK/NACK/SR resource index $n_{PUCCH}^{(1)}$ to transmit HARQ-ACK; wherein:

in subframe n−k, if there exists a physical downlink shared channel (PDSCH) indicated by PDCCH(s) or exists a PDCCH indicating release of SPS resource, wherein k∈K, K is a set including M elements $\{k_0, k_1, \ldots k_{M-1}\}$, the value of M is related to the uplink-downlink configuration (as shown in table 1). The UE firstly selects a value from $\{0, 1, 2, 3\}$ for p, meeting $N_p \leq n_{CCE} < N_{p+1}$, where $N_p = \max\{0, \lfloor [N_{RB}^{DL} \times (N_{sc}^{RB} \times p-4)]/36 \rfloor\}$; $n_{CCE}$ is an index of the first control channel element (CCE) used by PDCCH in subframe n−$k_m$, wherein −$k_m$ is a minimum value in the set K and meets a condition that the UE detects PDCCH in subframe n−$k_m$; ACK/NACK feedback uses the resource index $n_{PUCCH}^{(1)} = (M-m-1) \times N_p + m \times N_{p+1} + n_{CCE} + N_{PUCCH}^{(1)}$, wherein $N_{PUCCH}^{(1)}$ is a parameter configured by the higher layers.

In subframe n−k(k∈K), if there only exists PDSCH transmission without PDCCH indication, $n_{PUCCH}^{(1)}$ is configured by the higher layers and table 2.

For facilitating the description, one uplink feedback subframe is referred to as a feedback window.

For TDD ACK/NACK multiplexing, if M>1, in subframe $n_{PUCCH,i}$ is defined as an ACK/NACK feedback resource index obtained by subframe n−$k_i$, HARQ-ACK(i) is detailed information of ACK/NACK/DTX feedback corresponding to subframe n−$k_i$, wherein $k_i \in K$ (as shown in table 1), 0≤i≤M−1.

For the PDSCH or the PDCCH which indicates release of SPS resource in subframe n−$k_i$, wherein $k_i \in K$, the ACK/NACK feedback resource index is $n_{PUCCH,i}^{(1)} = (M-i-1) \times N_p + i \times N_{p+1} + n_{CCE,i} + N_{PUCCH}^{(1)}$, wherein p∈$\{0, 1, 2, 3\}$, and $N_p \leq n_{CCE} < N_{p+1}$, $N_p = \max\{0, \lfloor [N_{RB}^{DL} \times (N_{sc}^{RB} \times p-4)]/36 \rfloor\}$, $n_{CCE,i}$ is the index of the first CCE used by PDCCH in subframe n−$k_1$, $N_{PUCCH}^{(1)}$ is a parameter configured by higher layers.

For the PDSCH without PDCCH indication in subframe n−$k_i$, $n_{PUCCH,i}^{(1)}$ is configured by the higher layers and table 2.

It can be seen from the above that, in a dynamic system, if the above processing solution is still utilized, an ACK/NACK/SR resource conflict will be generated between users adopting protocols of different versions.

In order to solve this problem, an example of the present disclosure provides an ACK/NACK/SR resource mapping method, applied in a system including terminals adopting different types of protocols, such that ACK/NACK/SR resources of terminals utilizing different types of protocols do not overlap with each other.

A terminal which utilizing an existing protocol may still use an existing ACK/NACK resource mapping rule. The present disclosure describes the ACK/NACK/SR mapping rule of a terminal utilizing an advanced protocol, wherein the advanced protocol supports dynamic TDD and/or other techniques.

Figure 3:
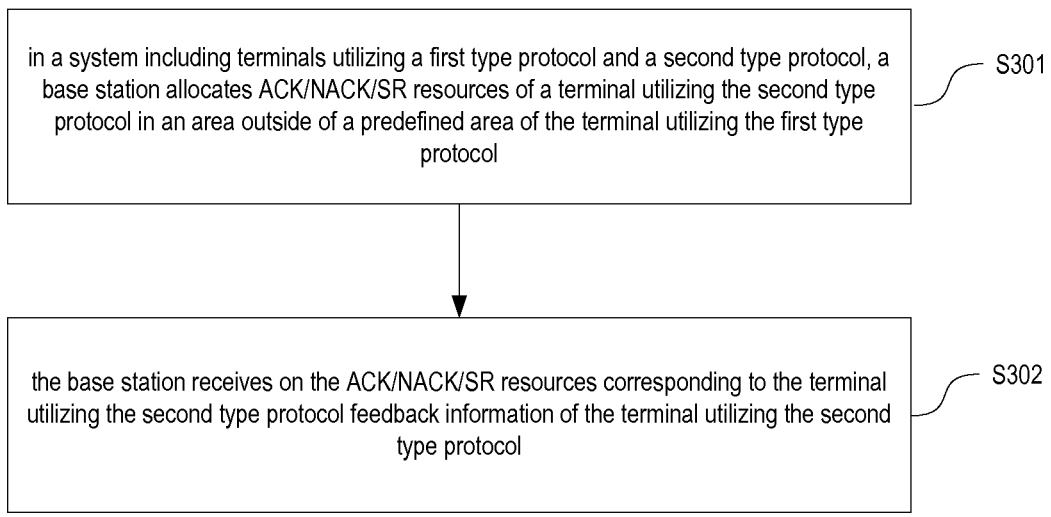
FIG. 3 is a flowchart illustrating an ACK/NACK/SR resource mapping method according to an example of the present disclosure.

FIG. 3 is a flowchart illustrating an ACK/NACK/SR resource mapping method according to an example of the present disclosure. As shown in FIG. 3, the method includes the following.

At block S301, in a system including a terminal utilizing a first type protocol and a terminal utilizing a second type protocol, a base station allocates ACK/NACK/SR resources of the terminal utilizing the second type protocol in an area outside a predefined area of the terminal utilizing the first type protocol.

TABLE 1

Downlink association set index K: $\{k_0, k_1, \ldots, k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

PUCCH Resource Index for Downlink Semi-Persistent Scheduling

| Value of 'TPC command for PUCCH' | $n_{PUCCH}^{(1,p)}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the high layers |

It should be noted that the allocation may be implemented by two manners.

In one manner, the base station determines the ACK/NACK/SR resources corresponding to the terminal utilizing the second type protocol by itself.

In block S301, if the base station determines the ACK/NACK/SR resources corresponding to the terminal utilizing the second type protocol by itself, the terminal utilizing the second type protocol needs to determine allocation information corresponding to its ACK/NACK/SR resources according to higher layer signaling (which directly carries the allocation information of the ACK/NACK/SR resources or carries corresponding assistant information) transmitted by the base station.

In this manner, if the base station allocates the ACK/NACK/SR resources of the terminal utilizing the second protocol in merely the higher layer configured area, the base station may directly inform the terminal utilizing the second type protocol of the allocation information of the ACK/NACK/SR resources, i.e., the above mentioned $n_{PUCCH}^{(1)}$ information via higher layer signaling.

In addition, for this implementation scenario, there may be two methods to inform the terminal of the allocation information of the ACK/NACK/SR resources.

In one method, the allocation information of the corresponding ACK/NACK/SR resources is informed using $n_{PUCCH,initial}^{(1)}$ information and offset information.

Firstly, the base station informs the terminal utilizing the second type protocol of the $n_{PUCCH,initial}^{(1)}$ information directly via higher layer signaling. The terminal utilizing the second type protocol determines the ACK/NACK/SR resources corresponding to a first downlink subframe in the feedback window according to the $n_{PUCCH,initial}^{(1)}$ information.

Thereafter, the terminal utilizing the second type protocol performs an offset processing to the $n_{PUCCH,initial}^{(1)}$ information according to an offset informed by the base station or according to predefined offset information, and determines the ACK/NACK/SR resources corresponding to following downlink subframes in the feedback window according to the $n_{PUCCH}^{(1)}$ information after the offset processing.

It should be noted that, the base station may transmit the offset information and the $n_{PUCCH,initial}^{(1)}$ information together to the terminal utilizing the second type protocol.

An exemplary offset processing may be as follows: adding different values of the offset information to the $n_{PUCCH,initial}^{(1)}$ information, so as to determine the $n_{PUCCH}^{(1)}$ information of different downlink subframes in the current feedback window. Certainly, other processing methods may also be adopted. In a practical application scenario, the value of the offset information applied may be determined according to a practical requirement. Variations of the value do not affect protection scope of the present disclosure.

In another method, the allocation information of the corresponding ACK/NACK/SR resources is informed by multiple pieces of $n_{PUCCH}^{(1)}$ information.

Firstly, the base station directly informs the terminal utilizing the second type protocol of the corresponding multiple pieces of a $n_{PUCCH}^{(1)}$ information via higher layer signaling, wherein the number of pieces of the $n_{PUCCH}^{(1)}$ information equals to the number of downlink subframes in the feedback window, or equals to a maximum number of downlink subframes in all feedback windows configured by current uplink-downlink configuration, or a maximum number of downlink subframes in all feedback windows configured by system.

The terminal utilizing the second type protocol respectively determines the ACK/NACK/SR resources corresponding to each downlink subframe according to the $n_{PUCCH}^{(1)}$ information.

It should be noted that, a relationship between the multiple pieces of $n_{PUCCH}^{(1)}$ information and the downlink subframes in the feedback window is determined by the terminal utilizing the second type protocol according to a predefined rule or according to the PDCCH information in each downlink subframe in the feedback window.

In another manner, the base station determines the ACK/NACK/SR resources corresponding to the terminal utilizing the second type protocol according to a predefined rule.

In block S301, if the base station determines the ACK/NACK/SR resources corresponding to the terminal utilizing the second type protocol according to the predefined rule, the terminal utilizing the second type protocol determines the allocation information corresponding to its ACK/NACK/SR resources directly according to the predefined rule with the same content, or according to the predefined rule with the same content and higher layer signaling (carries corresponding assistant information) transmitted by the base station.

If there is PDSCH scheduled by PDCCH or there is PDCCH which indicates release of SPS resource in the system, the base station allocates, according to the predefined rule, the ACK/NACK/SR resources corresponding to the terminal utilizing the second type protocol in an area outside the ACK/NACK/SR resources preserved for the terminal utilizing the first type protocol. The terminal utilizing the second type protocol determines the allocation information of the corresponding ACK/NACK/SR resources according to the higher layer signaling and the predefined rule.

Generally, the base station may configure different resource start points for the ACK/NACK/SR resource area predefined for the terminal utilizing the first type protocol and the ACK/NACK/SR resource area predefined for the terminal utilizing the second type protocol, so as to differentiate the corresponding ACK/NACK/SR resources.

Similarly, the configuration of the start points of different ACK/NACK/SR resources may also have two manners in the present disclosure.

In one manner, the ACK/NACK/SR resources of the terminal utilizing one type of protocol are configured in an area after the area of the ACK/NACK/SR resources of the terminal utilizing the other type of protocol.

In particular, the base station may allocate the ACK/NACK/SR resources corresponding to the terminal utilizing the second type protocol in an area in front of or after the ACK/NACK/SR resource area reserved for the terminal utilizing the first type protocol.

Based on the predefined rule, each terminal may determine the start point of its ACK/NACK/SR resources according to the start point of the terminal utilizing the first type protocol and the size of the predefined area of the first/second type protocol.

In another manner, different areas are allocated to the ACK/NACK/SR resources of the terminals utilizing different types of protocols, and different $N_{PUCCH}^{(1)}$ are indicated to the terminals.

Firstly, the base station allocates the ACK/NACK/SR resources corresponding to the terminal utilizing the second type protocol in an area outside the ACK/NACK/SR resource area perservered for the terminal utilizing the first type protocol.

Thereafter, the base station transmits a different $N_{PUCCH}^{(1)}$ to the terminal utilizing the second type protocol, such that the terminal utilizing the second type protocol determines the allocation information of the corresponding ACK/NACK/SR resource according to the different $N_{PUCCH}^{(1)}$.

The difference between the two manners is the first manner allocates adjacent areas to the ACK/NACK/SR resources of the terminals utilizing two different types of protocols. When the ACK/NACK/SR resources of the terminal utilizing the second type protocol is computed, merely the size of the area corresponding to the ACK/NACK/SR resources of the terminal utilizing the first or second type protocol needs to be considered, so as to deduce its resource start point. In the second manner, however, the start points of the ACK/NACK/SR resources of the two protocols are defined by the base station by itself. The terminals obtain their ACK/NACK/SR resource information according to different $N_{PUCCH}^{(1)}$.

In a practical application scenario, whichever of the above two manners is adopted, the process may be described as follows.

The base station allocates the ACK/NACK/SR resources corresponding to the terminal utilizing the second type protocol in an area outside the ACK/NACK/SR resource area reserved for the terminal utilizing the first type protocol according to the predefined rule, such that the terminal utilizing the second type protocol determines the allocation information of the corresponding ACK/NACK/SR information.

In addition, the above predefined rule refers to a relationship between the PDSCH scheduled by PDCCH or the PDCCH which indicates release of SPS resource in the feedback window and the ACK/NACK/SR resources. The relationship meets:

$$n_{PUCCH,i}^{(1)} = (M-i-1)N_p + iN_{p+1} + n_{CCE} + \text{Start};$$

wherein start denotes the start point of the predefined area of the ACK/NACK/SR resources corresponding to the terminal utilizing the second type protocol, generally, the start point is different from the $N_{PUCCH}^{(1)}$ of the terminal utilizing the first type protocol.

In a practical application scenario, the start point of the ACK/NACK/SR resources corresponding to the terminal utilizing the second type protocol includes the following situations.

In a first situation, Start=$N_{PUCCH,D}^{(1)}$, $N_{PUCCH,D}^{(1)}$ is configured by the base station by itself, but should not conflict with the ACK/NACK/SR resources of the terminal utilizing the first type protocol. The base station transmits the $N_{PUCCH,D}^{(1)}$ to the terminal utilizing the second type protocol via higher layer signaling, such that the terminal utilizing the second type protocol determines the allocation information of the corresponding ACK/NACK/SR resources according to the $N_{PUCCH,D}^{(1)}$ and the predefined rule.

In a second situation, Start=$N_{PUCCH}^{(1)}$+delta, delta is configured by the base station by itself. The base station transmits delta to the terminal utilizing the second type protocol via higher layer signaling, such that the terminal utilizing the second type protocol determines the allocation information of the corresponding ACK/NACK/SR resources according to $N_{PUCCH}^{(1)}$, delta and the predefined rule.

In a third situation, if the base station allocates the ACK/NACK/SR resources corresponding to the terminal utilizing the second type protocol in an area in front of the ACK/NACK/SR resources predefined for the terminal utilizing the first type protocol, Start=$N_{PUCCH}^{(1)} - F_B$, wherein $N_{PUCCH}^{(1)}$ denotes the start point of the ACK/NACK/SR resources predefined for the first type protocol, $F_B$ denotes a total amount of predefined ACK/NACK/SR resources reserved for the second type protocol.

In a practical application scenario, the total amount $F_B$ of the predefined ACK/NACK/SR resources reserved for the second type protocol may be further denoted by:

$$F_B = \begin{cases} M_D N_n - (M_D - k_D)(N_n - N_{n-1}) & n = 3 \\ M_D N_n & n = 0, 1, 2 \end{cases};$$

wherein $M_D$ denotes a number of downlink subframes of a feedback solution of the second type protocol in one feedback window; $k_D$ denotes number of special slots in the feedback solution of the second type protocol in one feedback window; $N_n$ denotes number of CCEs born by n PDCCH symbols; and n denotes the number of PDCCH symbols in the downlink subframe.

In a fourth situation, if the base station allocates the ACK/NACK/SR resources corresponding to the terminal utilizing the second type protocol in an area after the ACK/NACK/SR resources predefined for the terminal utilizing the first type protocol, Start=$N_{PUCCH}^{(1)} + F_A$, wherein $N_{PUCCH}^{(1)}$ denotes the start point of the ACK/NACK/SR resources predefined for the first type protocol, $F_A$ denotes a total amount of predefined ACK/NACK/SR resources reserved for the first type protocol.

In a practical application scenario, the total amount $F_A$ of the predefined ACK/NACK/SR resources reserved for the first type protocol may be further denoted by:

$$F_A = \begin{cases} M_{R8} N_n - (M_{R8} - k_{R8})(N_n - N_{n-1}) & n = 3 \\ M_{R8} N_n & n = 0, 1, 2 \end{cases};$$

wherein $M_{R8}$ denotes a number of downlink subframes of a feedback solution of the first type protocol in one feedback window; $k_{R8}$ denotes number of special slots included in the feedback solution of the first type protocol in one feedback window; $N_n$ denotes the number of CCEs born by n PDCCH symbols; and n denotes the number of PDCCH symbols in the downlink subframe.

For the above third and fourth situations, the number $_n$ of the PDCCH symbols in the downlink subframe is:

a maximum number of PDCCH symbols in downlink subframes of one feedback window; or configured by the base station by itself and indicated by higher layer signaling directly; or configured with a default value, e.g., n=3.

Whichever of the above manners is adopted to determine the value of n, the protection scope of the present disclosure is not affected.

It should be noted that, if the allocation information of the PUCCH resources corresponding to the terminal utilizing the second type protocol corresponds to physical layer resources, $\theta_{shift}^{PUCCH}$ may be informed by higher layer signaling or configured with a default value, e.g., $\Delta_{shift}^{PUCCH}=1$.

One of the above solutions may be adopted according to a requirement of a practical scenario. Whichever solution is adopted to implement the allocation of the ACK/NACK/SR resources, it is required to ensure that the ACK/NACK/SR resources corresponding to the terminals of two different types of protocols do not overlap.

At block S302, the base station receives feedback information of the terminal utilizing the second type protocol on the ACK/NACK/SR resources corresponding to the terminal utilizing the second type protocol.

Through the above processing, the base station finishes the allocation of the ACK/NACK/SR resources. The terminal utilizing the second type protocol also determines the allocation information of its ACK/NACK/SR resources. In subsequent information transmission procedure, the terminal utilizing the second type protocol performs uplink transmission of corresponding feedback information via its ACK/NACK/SR resources. The base station receives the feedback information on the corresponding resources.

Accordingly, at the terminal side, the terminal determines the allocation information of the ACK/NACK/SR resources following the predefined rule and according to the information informed by the base station. The processing may be seen from the above description and is not repeated herein.

Compared with conventional techniques, the technical solution provided by the example of the present disclosure has the following advantages.

According to the technical solution provided by the example of the present disclosure, in a system including a terminal utilizing a first type protocol and a terminal utilizing a second type protocol, the base station allocates the ACK/NACK/SR resources corresponding to the second type protocol in an area outside of the ACK/NACK/SR resource area reserved for the terminal utilizing the first type protocol, and informs the terminal utilizing the second type protocol of the allocation information of the corresponding ACK/NACK/SR resources. Thus, the terminal utilizing the second type protocol may transmit feedback information via the corresponding ACK/NACK/SR resources. In a dynamic system, conflict between ACK/NACK/SR resources of terminals utilizing different types of protocols can be avoided, especially the conflict between ACK/NACK/SR resources of R11 and/or following version users and low version users.

Hereinafter, the technical solution provided by the example of the present disclosure is described with reference to several application scenarios In order to avoid conflict between ACK/NACK/SR resources of different version users, especially between ACK/NACK/SR resources of R11 and following version users and old version users such as R8 users, the example of the present disclosure allocates resources outside a computed area of R8 users to PUCCH format 1/1a/1b resource of the R11 or following versions.

In case that SR and SPS which is not scheduled by PDCCH, PUCCH format 1/1a/1b resource is configured in the higher layer configured area, $n_{PUCCH}^{(1)}$ is informed by higher layer signaling.

On the other hand, in case that there is PDSCH scheduled by PDCCH or there is PDCCH which indicates release of SPS resource, the configuration and informing of the PUCCH format 1/1a/1b resource may be implemented by two methods.

In method 1, ACK/NACK/SR resources are configured in merely the higher layer configured area, $n_{PUCCH}^{(1)}$ is informed by higher layer signaling.

Implementation Manner 1

The base station transmits one piece of $n_{PUCCH,initial}^{(1)}$ information to each terminal, indicating the ACK/NACK/SR resources corresponding to the first downlink subframe in the feedback window.

The ACK/NACK/SR resources corresponding to following subframes in the feedback window may be determined according to $n_{PUCCH,k}^{(1)}$ obtained by offset processing.

In a practical application scenario, the $n_{PUCCH,k}^{(1)}$ may be determined as follows:

respectively adding 1, 2, . . . , M−1 $\Delta_{offset}$ to the $n_{PUCCH,initial}^{(1)}$, i.e., $n_{PUCCH,k}^{(1)} = n_{PUCCH,initial}^{(1)} + (n-1) \Delta_{offset}$.

$\Delta_{offset}$ may be any integer. In order to avoid resource fragment, it is possible to configure $\Delta_{offset}=1$.

In a practical application, $\Delta_{offset}$ may be informed by higher layer signaling or be defined by standards.

The base station obtains a detailed series of resources and physical resource block (PRB) resources according to $n_{PUCCH,k}^{(1)}$ and a PUCCH format 1/1a/1b mapping method defined by standard (36.211), the procedure is as follows.

$\Delta_{shift}^{PUCCH}$ may be informed by higher layer signaling and all users in the cell use this value. It is also possible to configure a default value 1. However, for conventional users and PUCCH in the computed area, the value informed by the higher layers is adopted.

In particular, $$n_{oc}^{(p)}(n_s) = \begin{cases} \lfloor n'_p(n_s) \cdot \Delta_{shift}^{PUCCH} / N' \rfloor & \text{for normal cyclic prefix} \\ 2 \cdot \lfloor n'_p(n_s) \cdot \Delta_{shift}^{PUCCH} / N' \rfloor & \text{for extended cyclic prefix} \end{cases}$$

$$\alpha_{\tilde{p}}(n_s, l) = 2\pi \cdot n_{cs}^{(\tilde{p})}(n_s, l) / N_{sc}^{RB}$$

$$n_{cs}^{(\tilde{p})}(n_s, l) =$$

$$\begin{cases} [n_{cs}^{cell}(n_s, l) + (n'_{\tilde{p}}(n_s) \cdot \Delta_{shift}^{PUCCH} + (n_{oc}^{(\tilde{p})}(n_s) \mod \Delta_{shift}^{PUCCH})) \mod N'] \mod N_{sc}^{RB} & \text{for normal cyclic prefix} \\ [n_{cs}^{cell}(n_s, l) + (n'_{\tilde{p}}(n_s) \cdot \Delta_{shift}^{PUCCH} + n_{oc}^{(\tilde{p})}(n_s)/2) \mod N'] \mod N_{sc}^{RB} & \text{for extended cyclic prefix} \end{cases}$$

where $$N' = \begin{cases} N_{cs}^{(1)} & \text{if } n_{PUCCH}^{(1,\tilde{p})} < c \cdot N_{cs}^{(1)} / \Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}.$$

The resource indices within the two resource blocks in the two slots of a subframe to which the PUCCH is mapped are given by $$n'_p(n_s) = \begin{cases} n_{PUCCH}^{(1,\tilde{p})} & \text{if } n_{PUCCH}^{(1,\tilde{p})} < c \cdot N_{cs}^{(1)} / \Delta_{shift}^{PUCCH} \\ \left( n_{PUCCH}^{(1,\tilde{p})} - c \cdot N_{cs}^{(1)} / \Delta_{shift}^{PUCCH} \right) & \\ \mod(c \cdot N_{sc}^{RB} / \Delta_{shift}^{PUCCH}) & \text{otherwise} \end{cases},$$

for $n_s \bmod 2=0$ and by $$n'_p(n_s) = \begin{cases} [c(n'_p(n_s-1)+1)] \\ \bmod(cN_{sc}^{RB}/\Delta_{shift}^{PUCCH}+1)-1 & n_{PUCCH}^{(1,\tilde{p})} \geq c \cdot N_{cs}^{(1)}/\Delta_{shift}^{PUCCH} \\ \lfloor h_{\tilde{p}}/c \rfloor + (h_{\tilde{p}} \bmod c)N'/\Delta_{shift}^{PUCCH} & \text{otherwise} \end{cases},$$

for $n_s \bmod 2=1$, where $h_{\tilde{p}}=(n'_p(n_s-1)+d) \bmod(cN'/\Delta_{shift}^{PUCCH})$, with d=2 for normal CP and d=0 for extended CP.

The parameter deltaPUCCH-Shift $\Delta_{shift}^{PUCCH}$ is provided by higher layers.

The physical resource blocks to be used for transmission of PUCCH in slot $n_s$ are given by $$n_{PRB} = \begin{cases} \lfloor \frac{m}{2} \rfloor & \text{if } (m+n_s \bmod 2) \bmod 2 = 0 \\ N_{RB}^{UL} - 1 - \lfloor \frac{m}{2} \rfloor & \text{if } (m+n_s \bmod 2) \bmod 2 = 1 \end{cases},$$

where the variable m depends on the PUCCH format. For formats 1, 1a and 1b $$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB}^{(2)} + \left\lceil \frac{N_{cs}^{(1)}}{8} \right\rceil \end{cases},$$

$$c = \begin{cases} 3 & \text{normal cyclic prefix} \\ 2 & \text{extended cyclic prefix} \end{cases}.$$

The terminal receives relevant higher layer signaling and obtains $n_{PUCCH}^{(1)}$ adopting the same computing method, so as to determine its corresponding ACK/NACK/SR resources.

Implementation Method 2

The base station transmits M pieces of $n_{PUCCH}^{(1)}$ via higher layer signaling, the value of M equals to the number of downlink subframes in the current feedback window, or equals to the maximum number of downlink subframes in feedback windows under all uplink-downlink configurations, or M=4.

The relationship between $n_{PUCCH}^{(1)}$ and the downlink subframes in the feedback window may be obtained according to the predefined rule, e.g., the nth $n_{PUCCH}^{(1)}$ corresponds to the nth downlink subframe in the feedback window, or is indicated by the PDCCH in the downlink subframe.

The terminal receives the higher layer signaling and/or PDCCH and obtains the $n_{PUCCH}^{(1)}$ according to the same rule.

In method 2, different start points of ACK/NACK/SR resources are configured for R8 users and dynamic users.

The dynamic users obtain the ACK/NACK/SR resource index $n_{PUCCH,i}^{(1)}=(M-i-1)N_p+iN_{p+1}+n_{CCE}+\text{Start}$ according to the predefined rule;

wherein Start denotes the start point of the predefined area of the ACK/NACK/SR resources corresponding to the terminal utilizing the second type protocol. Generally, the start point is different from the $N_{PUCCH}^{(1)}$ of the terminal utilizing the first type protocol.

Implementation Manner 3

Figure 4:
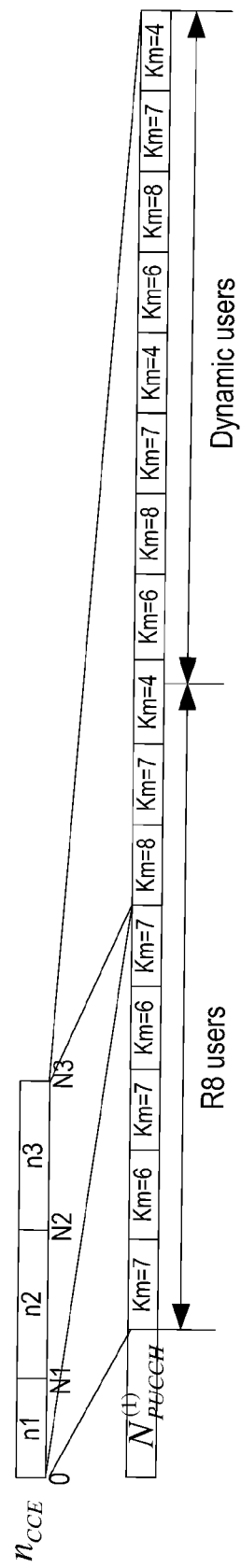
FIG. 4 is a schematic diagram illustrating a configuration solution when the ACK/NACK/SR resource mapping method is applied in an application scenario according to an example of the present disclosure.

The ACK/NACK/SR resources are allocated in an area after the ACK/NACK/SR resource area reserved for R8 users, an exemplary implementation solution is as shown in FIG. 4.

R8 users adopt uplink-downlink configuration 1, and dynamic users adopt uplink-downlink configuration 2.

In this scenario, for the dynamic users, $$n_{PUCCH,i}^{(1)}=(M-i-1)N_p+iN_{p+1}+n_{CCE}+\text{Start},$$

wherein Start=$N_{PUCCH}^{(1)}+F_A$, $F_A$ denotes the total amount of resources of the ACK/NACK/SR resource computed area reserved for R8 users.

In particular, in light of the above description of conventional ACK/NACK/SR resource index $n_{PUCCH}^{(1)}$, $F_A$ may be expressed as:

$$F_A = \begin{cases} M_{R8}N_n - (M_{R8}-k_{R8})(N_n-N_{n-1}) & n=3 \\ M_{R8}N_n & n=0,1,2 \end{cases}.$$

wherein $M_{R8}$ denotes a number of downlink subframes of a feedback solution of the first type protocol in one feedback window; $k_{R8}$ denotes number of special slots included in the feedback solution of the first type protocol in one feedback window; $N_n$ denotes the number of CCEs born by n PDCCH symbols; and n denotes the number of PDCCH symbols in the downlink subframe.

The number n of the PDCCH symbols in the downlink subframe may be: a maximum number of PDCCH symbols in downlink subframes of one feedback window; or configured by the base station by itself and indicated by higher layer signaling directly; or configured with a default value, e.g., n=3.

For ACK/NACK bundling and multiplexing, definitions of i are different, which is not described herein.

Implementation Manner 4

Figure 5:
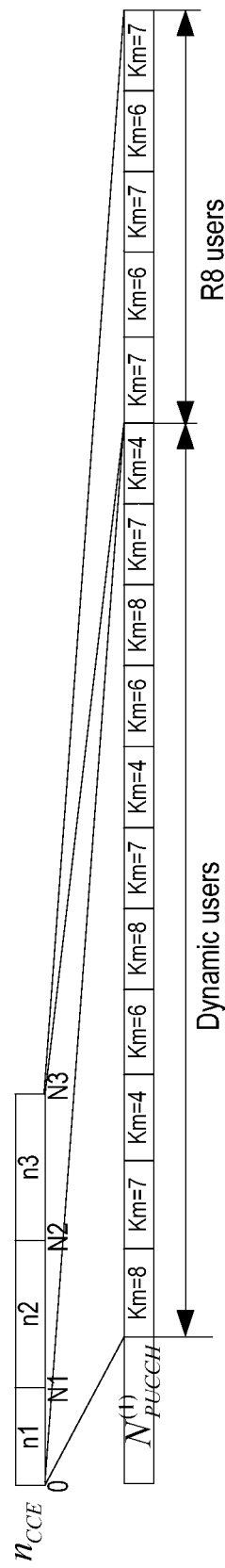
FIG. 5 is a schematic diagram illustrating a configuration solution when the ACK/NACK/SR resource mapping method is applied in an application scenario according to an example of the present disclosure.

ACK/NACK/SR resources are allocated in an area ahead of the ACK/NACK/SR resource area reserved for R8 users, $n_{PUCCH}^{(1)}$ is informed implicitly. A detailed configuration solution is as shown in FIG. 5.

R8 users adopt uplink-downlink configuration 2, and dynamic users adopt uplink-downlink configuration 1.

In this scenario, for dynamic users, $$n_{PUCCH,i}^{(1)}=(M-i-1)N_p+iN_{p+1}+n_{CCE}+\text{Start},$$

wherein Start=$N_{PUCCH}^{(1)}-F_B$, $F_B$ denotes total amount of resources in the PUCCH resource computed area reserved for the dynamic users.

In particular, refer to the above-mentioned PUCCH format 1/1a/1b resource index $n_{PUCCH}^{(1)}$ mapping method, $F_B$ may be noted by:

$$F_B = \begin{cases} M_D N_n - (M_D - k_D)(N_n - N_{n-1}) & n=3 \\ M_D N_n & n=0,1,2 \end{cases},$$

$M_D$ denotes number of downlink subframes included in the feedback solution of the second type protocol in one feedback window; $k_D$ denotes number of special slots included in the feedback solution of the second type protocol in one feedback window; $N_n$ denotes number of CCEs born by n PDCCH symbols; n denotes number of PDCCH symbols.

The number n of the PDCCH symbols in the downlink subframe may be: a maximum number of PDCCH symbols in the downlink subframes of the same feedback window, or configured by the base station by itself and indicated by higher layer signaling directly, or configured with a default value, e.g. n=3.

For ACK/NACK bundling and multiplexing, definitions of i may be different and are not repeated herein.

Implementation 5

Figure 6:
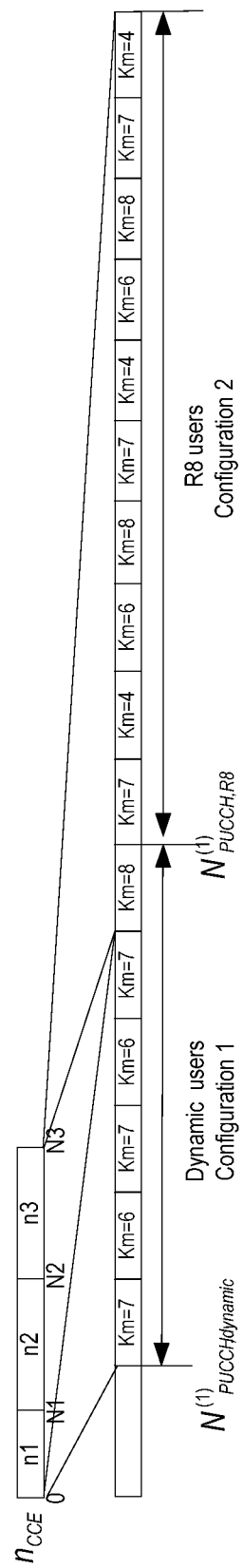
FIG. 6 is a schematic diagram illustrating a configuration solution when the ACK/NACK/SR resource mapping method is applied in an application scenario according to an example of the present disclosure.

ACK/NACK/SR resources are allocated in an area outside the R8 computed area and the higher layer configured area, $n_{PUCCH}^{(1)}$ is informed implicitly, but the base station indicates corresponding $N_{PUCCH}^{(1)}$ for two kinds of users. A detailed configuration solution is as shown in FIG. 6.

R8 users adopt uplink-downlink configuration 2, and dynamic users adopt uplink-downlink configuration 1.

In this scenario, the base station informs the R8 users and the dynamic users of different $N_{PUCCH}^{(1)}$ via higher layer signaling. The $N_{PUCCH}^{(1)}$ of R8 users is $N_{PUCCH,R8}^{(1)}$ and the $N_{PUCCH}^{(1)}$ of the dynamic users is $N_{PUCCH,dynamic}^{(1)}$.

In particular, during the determination of the $n_{PUCCH}^{(1)}$ of the R8 users and the dynamic users, different $N_{PUCCH}^{(1)}$ are put into $n_{PUCCH,i}^{(1)}=(M-i-1)N_p+iN_{p+1}+n_{CCE}+N_{PUCCH}^{(1)}$, so as to respectively obtain the $n_{PUCCH}^{(1)}$ of the R8 users and the dynamic users.

The terminal receives the relevant higher layer signaling and obtains the $n_{PUCCH}^{(1)}$ using the same computing method.

In a detailed implementation procedure, when the $n_{PUCCH}^{(1)}$ of the dynamic users is determined in this example, it is also possible to configure the Start in $n_{PUCCH,i}^{(1)}=(M-i-1)N_p+iN_{p+1}+n_{CCE}+$Start as Start=$N_{PUCCH,R}^{(1)}$+delta, wherein delta is configured by the base station by itself. The base station transmits delta to the terminal utilizing the second type protocol via higher layer signaling, such that the terminal utilizing the second type protocol determines the allocation information of the corresponding ACK/NACK/SR resources according to $N_{PUCCH}^{(1)}$, delta and the predefined rule. The variation does not affect the protection scope of the present disclosure.

It should be noted that, the method proposed in the implementation 3 does not restrict the resource mapping sequence of R8 users and the dynamic users.

Figure 7:
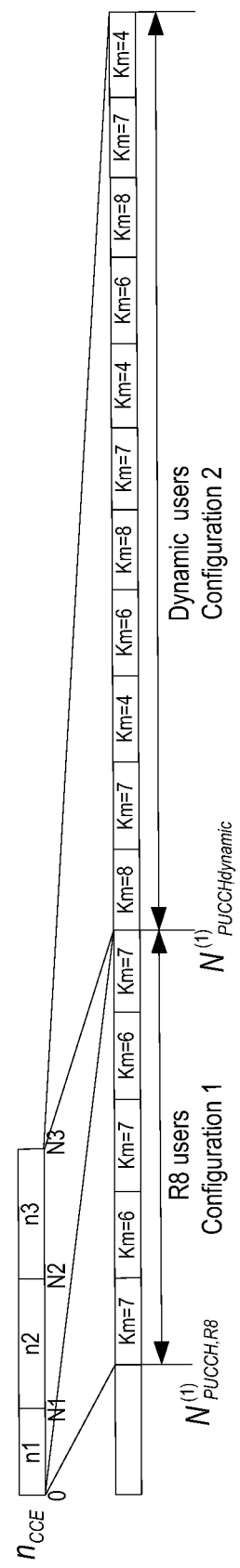
FIG. 7 is a schematic diagram illustrating a configuration solution when the ACK/NACK/SR resource mapping method is applied in an application scenario according to an example of the present disclosure.

Generally, positions of the resources of the R8 users and the dynamic users may be arranged by a principle of avoiding much resource fragment. FIG. 6 shows an example in which resources of the dynamic users are in front, whereas FIG. 7 shows an example in which resources of R8 users are in front.

The R8 users adopt the uplink-downlink configuration 1, and the dynamic users adopt the uplink-downlink configuration 2.

The detailed processing is similar to the above and is not repeated herein.

It should be noted that, the above solution is directed to solve the conflict between ACK/NACK/SR resources of the R11 and/or following version users and the old version such as R8 users. For protocol versions of other types, a similar processing method may be adopted. The variation does not affect the protection scope of the present disclosure.

Compared with conventional techniques, the technical solution provided by the example of the present disclosure has the following advantages.

According to the technical solution provided by the examples of the present disclosure, in a system including a terminal utilizing a first type protocol and a terminal utilizing a second type protocol, the base station allocates the ACK/NACK/SR resources corresponding to the second type protocol in an area outside of the ACK/NACK/SR resource area reserved for the terminal utilizing the first type protocol, and informs the terminal utilizing the second type protocol of the allocation information of the corresponding ACK/NACK/SR resources. Thus, the terminal utilizing the second type protocol may transmit feedback information via the corresponding ACK/NACK/SR resource. In a dynamic system, conflict between ACK/NACK/SR resources of terminals utilizing different types of protocols can be avoided, especially conflict between ACK/NACK/SR resources of R11 and/or following version users and low version users.

Figure 8:
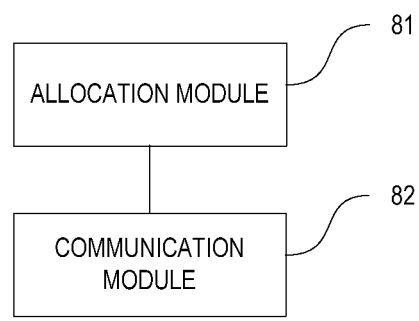
FIG. 8 is a schematic diagram illustrating a structure of a base station according to an example of the present disclosure.

In order to implement the technical solution of the example of the present disclosure, an example of the present disclosure further provides a base station, the structure is as shown in FIG. 8. The base station is applied in a system including a terminal utilizing a first type protocol and a terminal utilizing a second type protocol. The base station includes:

an allocation module 81, adapted to allocate ACK/NACK/SR resources corresponding to the terminal utilizing the second type protocol in an area outside an ACK/NACK/SR resource area reserved for the terminal utilizing the first type protocol; and a communication module 82, adapted to receive feedback information of the terminal utilizing the second type protocol on the ACK/NACK/SR resources corresponding to the terminal utilizing the second type protocol.

In a detailed implementation scenario, the allocation module 81 is further adapted to:

determine the ACK/NACK/SR resources corresponding to the terminal utilizing the second type protocol by itself; or determine the ACK/NACK/SR resources corresponding to the terminal utilizing the second type protocol according to a predefined rule.

The communication module 82 is further adapted to:
if the allocation module 81 determines the ACK/NACK/SR resources corresponding to the terminal utilizing the second type protocol by itself, transmit higher layer signaling and inform the terminal utilizing the second type protocol of allocation information of the ACK/NACK/SR resources.

The communication module 82 is further adapted to:
inform the terminal utilizing the second type protocol of $n_{PUCCH,initial}^{(1)}$ information via higher layer signaling, such that the terminal utilizing the second type protocol determines the ACK/NACK/SR resource corresponding to a first downlink subframe in a feedback window according to the $n_{PUCCH,initial}^{(1)}$ information, and determines ACK/NACK/SR resources corresponding to following downlink subframes in the feedback window according to $n_{PUCCH}^{(1)}$ obtained by an offset processing according to offset information informed by the base station or preconfigured offset information; or inform the terminal utilizing the second type protocol of multiple pieces of $n_{PUCCH}^{(1)}$ information via higher layer signaling, such that the terminal utilizing the second type protocol respectively determine the ACK/NACK/SR resource corresponding to each downlink subframe in a feedback window according to the multiple pieces of $n_{PUCCH}^{(1)}$ information, wherein the number of pieces of $n_{PUCCH}^{(1)}$ information equals to the number of downlink subframes in the current feedback window, or a maximum number of downlink subframes in all feedback windows of the current uplink-downlink configuration, or a maximum number of downlink subframes of all feedback windows configured in the system.

The allocation module 81 is further adapted to:
determine the ACK/NACK/SR resources corresponding to the terminal utilizing the second type protocol according to the predefined rule if the system has PDCCH scheduled PDSCH or PDCCH which indicates release of SPS resource.

Figure 9:
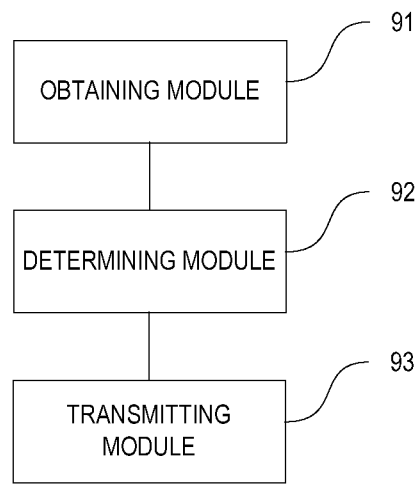
FIG. 9 is a schematic diagram illustrating a structure of a terminal according to an example of the present disclosure.

In addition, an example of the present disclosure further provides a terminal. The structure is as shown in FIG. 9. The terminal is applied in a system including a terminal utilizing a first type protocol and the terminal utilizing a second type protocol. The terminal includes:

an obtaining module 91, adapted to obtain allocation information of ACK/NACK/SR resources corresponding to the terminal via higher layer signaling transmitted by a base station or via a predefined rule;

a determining module 92, adapted to determine ACK/NACK/SR resources corresponding to the terminal according to the allocation information of the ACK/NACK/SR resources obtained by the obtaining module 91; wherein the ACK/NACK/SR resources corresponding to the terminal utilizing the second type protocol is allocated in an area outside of the ACK/NACK/SR resource area reserved for the terminal utilizing the first type protocol; and a transmitting module 93, adapted to transmit feedback information to the base station via the ACK/NACK/SR resources determined by the determining module 92.

The obtaining module 91 is further adapted to:

if the higher layer signaling carries only $n_{PUCCH,initial}^{(1)}$ information, determine the ACK/NACK/SR resource corresponding to a first downlink subframe in a feedback window according to the $n_{PUCCH,initial}^{(1)}$ information, and determine ACK/NACK/SR resources corresponding to following downlink subframes in the feedback window according to $n_{PUCCH}^{(1)}$ information which is obtained by performing an offset processing to the $n_{PUCCH,initial}^{(1)}$ information according to a predefined offset or according to an offset informed by the base station;

if the higher layer signaling carries multiple pieces of $n_{PUCCH,initial}^{(1)}$ information, respectively determine the ACK/NACK/SR resource corresponding to each downlink subframe in the feedback window according to the multiple pieces of $n_{PUCCH}^{(1)}$ information; wherein the number of pieces of $n_{PUCCH}^{(1)}$ information equals to the number of downlink subframes in the current feedback window, or equals to a maximum number of downlink subframes in all feedback windows of the current uplink-downlink configuration, or equals to a maximum number of downlink subframes in all feedback windows configured in the system.

In another scenario, the obtaining module 91 is further adapted to:

if the system has PDCCH scheduled PDSCH or PDCCH which indicates release of SPS resource, determine the allocation information of the ACK/NACK/SR resources according to the higher layer signaling and the predefined rule, or determine the allocation information of the corresponding ACK/NACK/SR resources according to the predefined rule;

the base station allocates the ACK/NACK/SR resources corresponding to the terminal utilizing the second type protocol in an area outside the ACK/NACK/SR resource area reserved for the terminal utilizing the first type protocol according to the predefined rule.

Compared with the conventional technique, the technical solution provided by the example of the present disclosure has the following advantages:

According to the technical solution provided by the examples of the present disclosure, in a system including a terminal utilizing a first type protocol and a terminal utilizing a second type protocol, the base station allocates the ACK/NACK/SR resources corresponding to the second type protocol in an area outside of the ACK/NACK/SR resource area reserved for the terminal utilizing the first type protocol, and informs the terminal utilizing the second type protocol of the allocation information of the corresponding ACK/NACK/SR resources. Thus, the terminal utilizing the second type protocol may transmit feedback information via the corresponding ACK/NACK/SR resources. In a dynamic system, conflict between ACK/NACK/SR resources of terminals utilizing different types of protocols can be avoided, especially conflict between ACK/NACK/SR resources of R11 and/or following version users and low version users.

Based on the above description of the examples of the present disclosure, those skilled in the art would know that the examples of the present disclosure may be implemented by hardware or by software and a necessary hardware platform. Based on this, the technical solution provided by the examples of the present disclosure may be embedded in a software product. The software product may be stored on a non-transitory storage medium (such as CD-ROM, U-disk, portable disk, etc.), including a set of instructions executable by a computer device (such as a personal computer, a server or a network device, etc.) to perform the method described by the examples of the present disclosure.

Those skilled in the art would know that the drawings are merely examples. The modules or blocks in the drawings may not be necessary for implementing the examples of the present disclosure.

Those skilled in the art would also know that the modules in the apparatus in each application scenario may be arranged in an apparatus in the application scenario according to the description of the application scenario. Some variations are also possible for the modules and the modules may be located in one or more apparatuses. The modules may be combined into one module or divided into several sub-modules.

The serial numbers of the examples of the present disclosure are merely used for facilitating the description but not denote any preference of the examples.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. An acknowledgement (ACK)/negative acknowledgement (NACK)/scheduling request (SR) resource mapping method, comprising:

allocating, by a base station in a system comprising a terminal utilizing a first type protocol and a terminal utilizing a second type protocol, ACK/NACK/SR resources corresponding to the terminal utilizing the second type protocol in an area outside of an ACK/NACK/SR resource area reserved for the terminal utilizing the first type protocol; and receiving, by the base station, feedback information of the terminal utilizing the second type protocol on the ACK/NACK/SR resources corresponding to the terminal utilizing the second type protocol;

wherein the allocating the ACK/NACK/ISR resources corresponding to the terminal utilizing the second type protocol in the area outside of the ACK/NACK/SR resource area reserved for the terminal utilizing the first type protocol comprises:

determining by the base station the ACK/NACK/SR resources corresponding to the terminal utilizing he second type protocol by itself; or determining, by the base station, the ACK/NACK/SR resources corresponding to the terminal utilizing the second type protocol according to a predefined rule.

2. The method of claim 1, further comprising:
if the base station determines the ACK/NACK/SR resources corresponding to the terminal utilizing the second type protocol by itself, informing, by the base station, the terminal utilizing the second type protocol of allocation information of the ACK/NACK/SR resources via higher layer signaling.

3. The method of claim 2, wherein the informing the terminal utilizing the second type protocol of the allocation information of the ACK/NACK/SR resources via higher layer signaling comprises:

informing, by the base station, the terminal utilizing the second type protocol of $n_{PUCCH,initial}^{(1)}$ information via higher layer signaling, such that the terminal utilizing the second type protocol determines, according to the $n_{PUCCH,initial}^{(1)}$ information, an ACK/NACK/SR resource corresponding to a first downlink subframe in a feedback window, and determines ACK/NACK/SR resources corresponding to following downlink subframes in the feedback window according to $n_{PUCCH,k}^{(1)}$ information which is obtained by performing an offset processing to the $n_{PUCCH,initial}^{(1)}$ information according to offset information informed by the base station or according to predefined offset information; or informing, by the base station, the terminal utilizing the second type protocol of multiple pieces of $n_{PUCCH}^{(1)}$ information via higher layer signaling, such that the terminal utilizing the second type protocol determines an ACK/NACK/SR resource corresponding to each downlink subframe in a feedback window according to the multiple pieces of $n_{PUCCH}^{(1)}$ information; wherein the number of pieces of $n_{PUCCH}^{(1)}$ information equals to number of downlink subframes in a current feedback window, or equals to a maximum number of downlink subframes in all feedback windows of a current uplink-downlink configuration, or equals to a maximum number of downlink subframes in all feedback windows in the system.

4. The method of claim 3, wherein a corresponding relationship between the multiple pieces of $n_{PUCCH}^{(1)}$ PUCCH information and the downlink subframes in the feedback window is determined by the terminal utilizing the second type protocol according to a predefined correspondence rule or according to physical downlink control channel (PDCCH) information in the downlink subframes in the feedback window.

5. The method of claim 1, wherein if the system has PDCCH scheduled physical downlink shared channel (PDSCH) or a PDCCH which indicates release of semi-persistent scheduling (SPS) resource, the base station determines the ACK/NACK/SR resources corresponding to the terminal utilizing the second type protocol according to the predefined rule.

6. The method of claim 1, wherein the predefined rule comprises a corresponding relationship between a physical downlink control channel (PDCCH) scheduled physical downlink shared channel (PDSCH) or a PDCCH which indicates release of semi-persistent scheduling (SPS) resource in a feedback window and the ACK/NACK/SR resources, the corresponding relationship meets:

$$n_{PUCCH,i}^{(1)}=(M-i-1)N_p+iN_{p+1}+n_{CCE}+\text{Start};$$

wherein M is a number of elements in set K and varies in accordance with an uplink and downlink configuration; $n_{CCE}$ is an index of the first control channel element CCE used b PDCCH n subframe $n-k_m$ wherein $k_m$ is a minimum value in the set K; p is a value selected in $\{0,1,2,3\}$, meeting $N_p^{£n}{}_{CCE}<N_{p+1}$; where $N_p=\max\{0,\lfloor [N_{RB}^{DL} \cdot (N_{sc}^{RB}\cdot p-4)]/36\rfloor\}$; $N_{RB}^{DL}$ denotes downlink bandwidth, and $N_{sc}^{RB}$ denotes number of subcarriers; Start denotes a predefined start point of the ACK/NACK/SR resources corresponding to the terminal utilizing the second type protocol, and the start point is different from $N_{PUCCH}^{(1)}$ of the terminal utilizing the first type protocol; wherein $N_{PUCCH}^{(1)}$ denotes a start point of the ACK/NACK/ISR resources corresponding to the terminal utilizing the first type protocol.

7. The method of claim 6, wherein the predefined start point of the ACK/NACK/SR resources corresponding to the terminal utilizing the second type protocol comprises:

Start=$N_{PUCCH,D}^{(1)}$, $N_{PUCCH,D}^{(1)}$ is configured by the base station by itself, avoiding ACK/NACK/SR resource conflict with the terminal utilizing the first type protocol; the base station transmits the $N_{PUCCH,D}^{(1)}$ to the terminal utilizing the second type protocol via higher layer signaling, such that the terminal utilizing the second type protocol determines the allocation information of the ACK/NACK/SR resources according to the $N_{PUCCH,D}^{(1)}$ and the predefined rule; wherein $N_{PUCCH,D}^{(1)}$ denotes a start point of the ACK/NACK/SR resources corresponding to the terminal utilizing the second type protocol; or Start=$N_{PUCCH}^{(1)}$+delta $_{,delta}$ is configured by the base station by itself, the base station transmits the delta to the terminal utilizing the second type protocol via higher layer signaling, such that the terminal utilizing the second type protocol determines the allocation information of the ACK/NACK/SR resources according to the $N_{PUCCH}^{(1)}$ delta and the predefined rule; or if the base station allocates the ACK/NACK/SR resources corresponding to the terminal utilizing the second type protocol in the area in front of the ACK/NACK/SR resource area reserved for the terminal utilizing the first type protocol, Start=$N_{PUCCH}^{(1)}-F_B$, wherein $N_{PUCCH}^{(1)}$ denotes a start point of predefined ACK/NACK/SR resources of the first type protocol, $F_B$ denotes a total amount of ACK/NACK/SR resources reserved for the second type protocol; or if the base station allocates the ACK/NACK/SR resources corresponding to the terminal utilizing the second type protocol in the area after the ACK/NACK/SR resource area reserved for the terminal utilizing the first type protocol, Start=$N_{PUCCH}^{(1)}+F_A$, wherein, $F_A$ denotes a total amount of ACK/NACK/SR resources reserved for the first type protocol.

8. The method of claim 7, wherein
the total amount $F_B$ of ACK/NACK/SR resources reserved for the second type protocol is further expressed as:

$$F_B = \begin{cases} M_D N_n - (M_D - k_D)(N_n - N_{n-1}) & n = 3 \\ M_D N_n & n = 0, 1, 2 \end{cases},$$

the total amount $F_A$ of the ACK/NACK/SR resources reserved for the first type protocol is further expressed as:

$$F_A = \begin{cases} M_{R8}N_n - (M_{R8} - k_{R8})(N_n - N_{n-1}) & n = 3 \\ M_{R8}N_n & n = 0, 1, 2 \end{cases},$$

wherein $M_D$ denotes a number of downlink subframes of a feedback solution of the second type protocol in one feedback window; $k_D$ denotes a number of special slots in the feedback solution of the second type protocol in one feedback window; $M_{R8}$ denotes a number of downlink subframes in a feedback solution of the first type protocol in one feedback window; $k_{R8}$ denotes a number of special slots in the feedback solution of the first type protocol in one feedback window; $N_n$, denotes a number of control channel elements (CCEs) born by n PDCCH symbols, n denotes the number of PDCCH symbols in the downlink subframes, wherein the number of symbols is: a maximum number of PDCCH symbols in the downlink subframes of one feedback window; or, is configured by the base station by itself and is indicated by higher layer signaling; or, is configured with a default value.

9. An acknowledgement (ACK)/negative acknowledgement (NACK)/scheduling request (SR) resource mapping method, comprising:

allocating base station in a system comprising terminal utilizing a first type protocol and a terminal utilizing a second type protocol ACK/NACK/SR resources corresponding to the terminal utilizing the second type protocol in an area outside of an ACK/NACK/SR resource area reserved for the terminal utilizing the first type protocol; and receiving, by the base station, feedback information of the terminal utilizing the second type protocol on the ACK/NACK/SR resources corresponding to the terminal utilizing the second type protocol;

wherein if the terminal utilizing the second type protocol determines that the allocation information $n_{PUCCH,i}^{(1)}$ of the ACK/NACK/SR resources corresponds to physical layer resources, where $n_{PUCCH,i}^{(1)}$ denotes an index of the ACK/INACK/SR resources, $D_{shift}^{PUCCH}$ is a parameter provided by higher layer, and is informed by higher layer signaling or is configured to be 1 in default.

10. An acknowledgement (ACK)/negative acknowledgement (NACK)/scheduling request (SR) resource mapping method, comprising:

obtaining, by a terminal utilizing a second type protocol in a system comprising a terminal utilizing a first type protocol and the terminal utilizing the second type protocol, allocation information of ACK/NACK/SR resources corresponding to the terminal utilizing the second type protocol according to higher layer signaling transmitted by a base station and/or a predefined rule; wherein the ACK/NACK/SR resources corresponding to the terminal utilizing the second type protocol is allocated in an area outside of an ACK/NACK/SR resource area reserved for the terminal utilizing the first type protocol;

determining, by the terminal utilizing the second type protocol, the ACK/NACK/SR resources corresponding to the terminal utilizing the second type protocol according to the allocation information of the ACK/NACK/SR resources; and transmitting, by the terminal utilizing the second type protocol, feedback information to the base station on the ACK/NACK/SR resources corresponding to the terminal utilizing the second type protocol.

11. The method of claim 10, wherein the obtaining the allocation information of the ACK/NACK/SR resources corresponding to the terminal utilizing the second type protocol according to the higher layer signaling transmitted by the base station comprises:

if the higher layer signaling carries $n_{PUCCH,initial}^{(1)}$ information, determining, by the terminal utilizing the second type protocol, an ACK/NACK/SR resource corresponding to a first downlink subframe in a feedback window according to the $n_{PUCCH,initial}^{(1)}$ information, and determining ACK/NACK/SR resources corresponding to following downlink subframes in the feedback window according to $n_{PUCCH,k}^{(1)}$ information which is obtained by performing an offset processing to the $n_{PUCCH,initial}^{(1)}$ information according to offset information informed by the base station or according to predefined offset information;

if the higher layer signaling carries multiple pieces of $n_{PUCCH}^{(1)}$ information, determining, by the terminal utilizing the second type protocol, an ACK/NACK/SR resource corresponding to each downlink subframe in a feedback window according to the multiple pieces of $n_{PUCCH}^{(1)}$ information; wherein the number of pieces of the $n_{PUCCH}^{(1)}$ information equals to number of downlink subframes in a current feedback window, or equals to a maximum number of downlink subframes in all feedback windows of a current uplink-downlink configuration, or equals to a maximum number of downlink subframes in all feedback windows in the system.

12. The method of claim 11, wherein a corresponding relationship between the multiple pieces of $n_{PUCCH}^{(1)}$ information and the downlink subframes in the feedback window is determined by the terminal utilizing the second type protocol according to a predefined correspondence rule or according to physical downlink control channel (PDCCH) information in the downlink subframes in the feedback window.

13. The method of claim 10, wherein the obtaining the allocation information of the ACK/NACK/SR resources corresponding to the terminal according to the higher layer signaling transmitted by the base station and/or the predefined rule comprises:

if the system has a PDCCH scheduled physical downlink shared channel (PDSCH) or a PDCCH which indicates release of semi-persistent scheduling (SPS) resource, determining, by the terminal, the allocation information of the ACK/NACK/SR resources corresponding to the terminal according to the higher layer signaling and the predefined rule, or according to the predefined rule;

wherein the base station allocates the ACK/NACK/SR resources corresponding to the terminal utilizing the second type protocol in the area outside of the ACK/NACK/SR resource area reserved for the terminal utilizing the first type protocol.

14. The method of claim 10, wherein the predefined rule comprises a corresponding relationship between a physical downlink control channel (PDCCH) scheduled physical downlink shared channel (PDSCH) or a PDCCH which indicates release of semi-persistent scheduling (SPS) resource in a feedback window and the ACK/NACK/SR resources, the corresponding relationship meets:

$n_{PUCCH,i}^{(1)} = (M-i-1)N_p + iN_{p+1} + n_{CCE} + \text{Start};$ wherein M is a number of elements in set K and varies in accordance with uplink-downlink information; $n_{CCE}$ denotes an index of the first control channel element CCE used b PDCCH in subframe $n-k_m$, wherein $k_m$ is a minimum value in the set K; p is a value selected in $\{0,1,2,3\}$ meeting $N_p \pounds n_{CCE} < N_{p+1}$, where $N_p = \max\{0, \lfloor [N_{RB}^{DL} \cdot (N_{sc}^{RB} \cdot p-4)]/36 \rfloor\}$; $N_{RB}^{DL}$ denotes downlink bandwidth, and $N_{sc}^{RB}$ denotes number of subcarriers; Start denotes a start point of the ACK/NACK/SR resources corresponding to the terminal utilizing the second type protocol, and the start point is different from $N_{PUCCH}^{(1)}$ of the terminal utilizing the first type protocol; wherein $N_{PUCCH}^{(1)}$ denotes a start point of he ACK/NACK/SR resources corresponding to the terminal utilizing the first type protocol.

15. The method of claim 14, wherein the start point of the ACK/NACK/SR resources corresponding to the terminal utilizing the second type protocol comprises:
  receiving, by the terminal utilizing the second type protocol, $N_{PUCCH,D}^{(1)}$ transmitted by the base station to the terminal utilizing the second type protocol via the higher layer signaling, and configuring the $N_{PUCCH,D}^{(1)}$ as the start point of the ACK/NACK/SR resources corresponding to the terminal utilizing the second type protocol, Start=$N_{PUCCH,D}^{(1)}$, determining, by the terminal utilizing the second type protocol, the allocation information of the ACK/NACK/SR resources according to the $N_{PUCCH,D}^{(1)}$ and the predefined rule;
  wherein $N_{PUCCH,D}^{(1)}$ denotes a start point of the ACK/NACK/SR resources corresponding to the terminal utilizing the second type protocol; or
  receiving, by the terminal utilizing the second type protocol, delta transmitted by the base station to the terminal utilizing the second type protocol, the start point of the ACK/NACK/SR resources corresponding to the terminal utilizing the second type protocol is Start=$N_{PUCCH}$+delta, determining, by the terminal utilizing the second type protocol, the allocation information of the ACK/NACK/SR resources according to the $N_{PUCCH}^{(1)}$, delta and the predefined rule; or
  if the base station allocates the ACK/NACK/SR resources corresponding to the terminal utilizing the second type protocol in the area in front of the ACK/NACK/SR resource area reserved for the terminal utilizing the first type protocol, receiving, by the terminal utilizing the second type protocol, $N_{PUCCH}^{(1)}$ transmitted by the base station via the higher layer signaling, wherein the start point of the ACK/NACK/SR resources corresponding to the terminal utilizing the second type protocol is Start=$N_{PUCCH}^{(1)} F_B$ determining, by the terminal utilizing the second type protocol, the allocation information of the ACK/NACK/SR resources according to the predefined rule, wherein $N_{PUCCH}^{(1)}$ denotes the start point of ACK/NACK/SR resources of the first type protocol, $F_B$ denotes a total amount of ACK/NACK/SR resources reserved for the second type protocol; or
  if the base station allocates the ACK/NACK/SR resources corresponding to the terminal utilizing the second type protocol in the area after the ACK/NACK/SR resource area reserved for the terminal utilizing the first type protocol, receiving, by the terminal utilizing the second type protocol, $N_{PUCCH}^{(1)}$ transmitted by the base station via the higher layer signaling, wherein the start point of the ACK/NACK/SR resources corresponding to the terminal utilizing the second type protocol is Start=$N_{PUCCH}^{(1)}+F_A$, determining, by the terminal utilizing the second type protocol, the allocation information of the ACK/NACK/SR resources according to the predefined rule, wherein $F_A$ denotes a total amount of ACK/NACK/SR resources reserved for the first type protocol.

16. A terminal utilizing a second type protocol, applied in a system comprising a terminal utilizing a first type protocol and the terminal utilizing the second type protocol, comprising:
  an obtaining module to obtain allocation information of acknowledgement (ACK)/negative acknowledgement (NACK)/scheduling request (SR) resources corresponding to the terminal utilizing the second type protocol according to higher layer signaling transmitted by the base station and/or a predefined rule, wherein the ACK/NACK/SR resources corresponding to the terminal utilizing the second type protocol is allocated in an area outside of an ACK/NACK/SR resource area reserved for the terminal utilizing the first type protocol;
  a determining module to determine the ACK/NACK/SR resources corresponding to the terminal utilizing the second type protocol according to the allocation information corresponding to the ACK/NACK/SR resources obtained by the obtaining module; and
  a transmitting module to transmit feedback information to the base station on the ACK/NACK/SR resources determined by the determining module.

17. The terminal of claim 16, wherein the obtaining module is further to:
  determine, if the higher layer signaling carries $n_{PUCCH,initial}^{(1)}$ information, an ACK/NACK/SR resource corresponding to a first downlink subframe in a feedback window according to the $n_{PUCCH,initial}^{(1)}$ information, and determine ACK/NACK/SR resources corresponding to following downlink subframes in the feedback window according to $n_{PUCCH,k}^{(1)}$ information which is obtained by performing an offset processing to the $n_{PUCCH,initial}^{(1)}$ information according to offset information informed by the base station or according to predefined offset information;
  determine, if the higher layer signaling carries multiple pieces of $n_{PUCCH}^{(1)}$ information, an ACK/NACK/SR resource corresponding to each downlink subframe in a feedback window according to the multiple pieces of $n_{PUCCH}^{(1)}$ information; wherein the number of pieces of the $n_{PUCCH}^{(1)}$ information equals to number of downlink subframes in a current feedback window, or equals to a maximum number of downlink subframes in all feedback windows of a current uplink-downlink configuration, or equals to a maximum number of downlink subframes in all feedback windows in the system.

18. The terminal of claim 16, wherein the obtaining module is further to:
  if the system has a physical downlink control channel (PDCCH) scheduled physical downlink shared channel (PDSCH) or a PDCCH which indicates release of semi-persistent scheduling (SPS) resource, determine the allocation information of the ACK/NACK/SR resources corresponding to the terminal according to the higher layer signaling and the predefined rule, or according to the predefined rule;
  wherein the base station allocates the ACK/NACK/SR resources corresponding to the terminal utilizing the second type protocol in the area outside of the ACK/NACK/SR resource area reserved for the terminal utilizing the first type protocol.

* * * * *